(12) United States Patent
Daigle et al.

(10) Patent No.: US 12,145,487 B2
(45) Date of Patent: Nov. 19, 2024

(54) SYSTEM FOR CONNECTING A SEAT COVER TO A SEAT BACK

(71) Applicant: ADIENT US LLC, Plymouth, MI (US)

(72) Inventors: Emilie N. Daigle, Camden, SC (US); Bonnie L. Coker, Whitmore Lake, MI (US); Marc Poulin, Chesterfield, MI (US); Michael W. Hobbs, Stamping Ground, KY (US); Raymond S. Bristow, Jackson, MI (US)

(73) Assignee: Adient US LLC, Plymouth, MI (US)

( * ) Notice: Subject to any disclaimer, the term of this patent is extended or adjusted under 35 U.S.C. 154(b) by 168 days.

(21) Appl. No.: 17/772,780

(22) PCT Filed: Oct. 30, 2020

(86) PCT No.: PCT/US2020/058117
§ 371 (c)(1),
(2) Date: Apr. 28, 2022

(87) PCT Pub. No.: WO2021/087204
PCT Pub. Date: May 6, 2021

(65) Prior Publication Data
US 2023/0036298 A1  Feb. 2, 2023

Related U.S. Application Data

(60) Provisional application No. 62/928,366, filed on Oct. 31, 2019.

(51) Int. Cl.
*B60N 2/58* (2006.01)
(52) U.S. Cl.
CPC .................. *B60N 2/5833* (2013.01)

(58) Field of Classification Search
CPC .......................... B60N 2/5833; B60N 2/5816
USPC ....................................................... 297/DIG. 6
See application file for complete search history.

(56) References Cited

U.S. PATENT DOCUMENTS

| | | | |
|---|---|---|---|
| 3,717,908 A | 2/1973 | Perina | |
| 5,171,395 A | 12/1992 | Gilcreast | |
| 5,967,614 A * | 10/1999 | Schmidt | B29C 51/10 297/229 |
| 7,007,473 B2 | 7/2006 | Demain et al. | |
| 8,322,002 B2 | 12/2012 | Cheng | |
| 8,745,827 B2 * | 6/2014 | Rocha | B60N 2/5833 24/442 |

(Continued)

FOREIGN PATENT DOCUMENTS

| | | |
|---|---|---|
| DE | 69205112 T2 | 5/1996 |
| DE | 102010029377 A1 | 7/2011 |

(Continued)

OTHER PUBLICATIONS

European Patent Office, International Search Report with Written Opinion, issued in PCT/US2020/058117, Jan. 14, 2021, 9 pages, European Patent Office, Rijswijk, Netherlands.

*Primary Examiner* — Milton Nelson, Jr.
(74) *Attorney, Agent, or Firm* — Marshall & Melhorn, LLC

(57) ABSTRACT

A system for connecting a seat cover and a seat back is disclosed. The system may have a fastener strip with a sinusoidal shape that connects the cover to the seat back so that at least a portion the cover can be seamless over the fastener strip. The design of the fastener strip permits it to be hidden from view on an exterior of the cover.

16 Claims, 2 Drawing Sheets

(56) References Cited

U.S. PATENT DOCUMENTS

| | | |
|---|---|---|
| 9,015,907 B2 | 4/2015 | Cheng |
| 9,795,194 B2 | 10/2017 | Rocha |
| 10,099,583 B2 | 10/2018 | Schulze |
| 10,405,614 B2 | 9/2019 | Rocha |
| 11,058,186 B2 | 7/2021 | Rocha |
| 2010/0176538 A1 | 7/2010 | Nozawa et al. |
| 2011/0030176 A1 | 2/2011 | Toh et al. |
| 2011/0167598 A1 | 7/2011 | Cheng |
| 2012/0011685 A1 | 1/2012 | Rocha |
| 2014/0130311 A1 | 5/2014 | Okuda et al. |

FOREIGN PATENT DOCUMENTS

| | | | |
|---|---|---|---|
| EP | 3123891 A1 | 2/2017 | |
| JP | H10272268 A | 10/1998 | |
| WO | WO-9513911 A1 * | 5/1995 | ........... B29C 44/146 |
| WO | WO2004/089690 A1 | 10/2004 | |

* cited by examiner

SYSTEM FOR CONNECTING A SEAT COVER TO A SEAT BACK

FIELD

One embodiment of a system for connecting a seat cover to a seat back is disclosed. The system may be used with a seat, such as for a vehicle seat. A method of using and making the system is also provided.

BACKGROUND

In their simplest form, vehicle seats are often times constructed of a frame, a molded foam pad and a covering. The frame provides support to the seat and it securely connects the seat to the vehicle. The foam pad connects with the frame and not only provides a comfortable seating surface for the occupant but it often also helps to define an aesthetically pleasing shape for the seat (the frame can also help to provide the shape as well). The covering typically extends over the frame and seat and covers, encloses and contains the frame and foam pad. In addition to these functions, the covering may also provide a comfortable, direct contact surface for the occupant and also provide aesthetic details and finishes to the seat that the other seat components do not.

The covering may also be used in conjunction with trim on the vehicle seat. Trim may be used to delineate sections, or provides features, of the seat and add additional aesthetic value to the seat. The trim is typically directly attached to the covering and can be used to cover a seam.

In the past, a seam could be used to delineate sections, or provide features to the seat. Further, a seam in the seat provided an area where the covering could be secured and/or where the trim could be connected to the underlying cushion.

Unfortunately, however, the available combinations of trim, seams and the underlying cushion limited seat designs and cover appearance. For example, in WO 2004/089680 A1 a seat cushion is disclosed having a first generally planar, central region, and a second, generally, non-planar region where the two regions are separated by a trench. A fastener strip is located in the trench. A covering is located over the two regions and secured within the trench. The required use of the trench in this case provides limited freedom for other seat designs and appearances, and it fixed the location of the trim to the location of the trench.

Others concepts have attempted to use seamless covers to provide more design options for seats, but these concepts also have their disadvantages. For example, U.S. Pat. No. 10,099,583 B2 discloses the use of a molding secured to a lining via a seam, an adhesive bond, fusing (such as flame lamination) and/or the use of additional materials or complex manufacturing processes. This too is disadvantageous because of the additional materials needed and complex manufacturing processes needed to make the cover.

In view of the disadvantages associated with the known prior art seat coverings, it would be advantageous for a seat covering to be seamless, to be simple to use and manufacture, and to be cost effective but also be effective in locating and securing the seat cover to the seat. It would also be advantageous for a system for connecting a seat cover to a seat back to do so without limitation on where the connection occurs, including independent of a seam location, to provide design freedom and aesthetically pleasing seat covers.

SUMMARY

In one embodiment, a system for connecting a seat cover and a seat back may have a seat back and a fastener strip. The fastener strip may have a sinusoidal shape, and a seat back side and an opposite cover side. The seat back side may be connected to the seat back. The cover side may be one part of a hook and loop fastener system. A second part of the hook and loop fastener system on the cover side may be connected to an interior side of the seat cover.

In another aspect, the seat back may have a concave shape formed by seat bolsters at least partially bounding side portions of a center section of the seat back where the center section may be in a lower plane compared with a plane formed by upper edges of the seat bolsters.

In another aspect, the fastener strip may be located within the center section of the seat back to conform the interior side of the seat cover to the seat back.

In another aspect, a portion of an exterior side of the seat cover covering is planar and the sinusoidal shape of the fastener strip is not visible on the exterior side of the seat cover when the seat cover is installed on the seat back.

In another aspect, the seat cover is seamless.

In another aspect, a portion of the seat cover located at least partially over the side bolsters and entirely over the seat center section is seamless.

In another aspect, the seat cover directly adjacent the fastener system is continuous, seam free and aperture free.

In another aspect, the fastener strip is immovably connected to the seat back.

In another aspect, the sinusoidal shape of the fastener strip comprises an upper surface of the fastener strip with an oscillation of at least one period and a lower surface of the fastener strip with an oscillation of a complementary period to the upper surface.

In another aspect, the sinusoidal shape of the fastener strip comprises an upper surface with two coplanar apex portions separated by a trough portion and a lower surface with two coplanar apex portions separated by a trough portion, where the trough portions may be vertically aligned with one another and the two pairs of coplanar apex portions may be vertically aligned with one another.

In another aspect, a plane in which the cover side of the fastener strip is located may be below the plane formed by upper edges of the seat bolsters.

In another aspect, the fastener strip may be directly connected to the interior side of the seat cover with no intervening structures or layers.

In another aspect, no part of the fastener system extends through the seat cover from the interior side to an exterior side of the cover.

In another aspect, the seat cover directly adjacent the fastener system may be unitary, one-piece and integrally formed.

In another aspect, the second part of the hook and loop fastener system on the cover side may be laminated to the interior side of the seat cover.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

It is to be understood that the device may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figure 1:
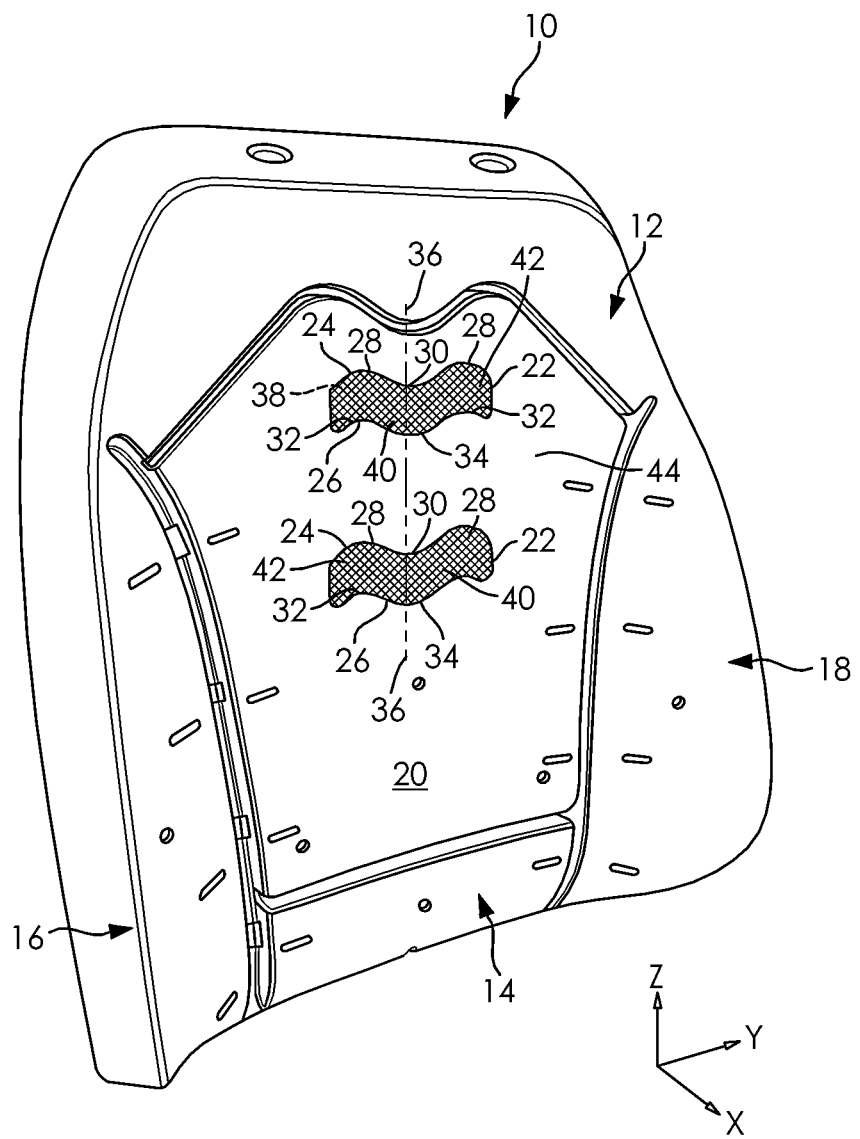
FIG. 1 is a schematic, perspective view of one embodiment of a seat back and a fastener strip.

Turning to FIG. 1, one embodiment of a seat back 10 is depicted. FIG. 1 also depicts a Cartesian coordinate system which has three special directions that are perpendicular to one another. When the seat back 10 is installed in a vehicle (not shown), a longitudinal direction x runs substantially horizontally and preferably parallel to a longitudinal direction of the vehicle, which corresponds to a forward direction of travel for the vehicle. A transverse direction y runs perpendicularly to the longitudinal direction x, is oriented horizontally in the vehicle and runs parallel to the forward direction of the vehicle. A vertical direction z runs perpendicularly to the longitudinal direction x and perpendicularly to the transverse direction y. When the seat back 10 is installed in the vehicle, the vertical direction z runs parallel to the vertical axis of the vehicle.

The position and directions mentioned above relate to a viewing direction of an occupant in the seat back 10 in a normal sitting position where the seat back 10 is oriented as usual in the direction of travel. However, the seat back 10 can be installed in other orientations, for example, transversely with respect to the direction of travel.

The seat back 10 may be such as for a vehicle seat but other uses are permissible. The seat back 10 depicted in the figure is one embodiment of a backrest. While a backrest is depicted, the information that follows can be readily adapted for use with the bottom, or seat, portion.

The seat back 10 may be supported by a framework (not shown) located within, or associated with, the seat back 10. The framework may be comprised of one or more frame pieces connected together in the general shape of the seat back 10. The framework provides structural rigidity to the seat back 10 and also connects to a stationary platform, such as a vehicle frame.

The seat back 10 in the depicted embodiment may be comprised of an upper portion 12, an opposite lower portion 14 and two opposed side portions 16, 18. A central portion 20 may be located between the upper and lower portions 12, 14 and the side portions 16. 18. The upper portion 12 may be adapted to selectively receive a headrest (not shown) therein. The lower portion 14 may be adapted for complementary attachment with the seat/bottom. The side portions 16, 18 may be comprised of bolster portions. The bolster portions may be portions that are similarly angled or pivoted from the relatively planar central portion 20. The bolster portions may help to assist with occupant comfort and may help center the occupant on the seat back 10.

In one embodiment, the central portion 20 defines one plane in which the central portion (at least the front of the central portion, compared to the back of the central portion (not shown)) exclusively, or substantially, exists. The bolster portions, however, because of their shape and angled nature, extend out of the central portion plane. Upper edges of the bolster portions form a side bolster plane that is located above the central portion plane and the two planes are not coplanar. As a result of this design, the seat back 10 in the depicted embodiment has a concave shape formed by the bolster portions and the central portion 20.

As shown in the embodiment depicted in FIG. 1, a fastener strip 22 may be located in or on the seat back 10. In this embodiment, the fastener strip 22 may be located in/on the central portion 20 of the seat back 10.

The fastener strip 22 may have a sinusoidal shape. In one embodiment, the sinusoidal shape of the fastener strip 22 is created by an upper surface 24 of the fastener strip 22 having an oscillation of at least one period and a lower surface 26 of the fastener strip 22 having an oscillation of a complementary period to the upper surface 24. In other words, the upper surface 24 and the lower surface 26 of the fastener strip 22 may be parallel, or substantially parallel, one another along their path. While at least one period is shown, it can be appreciated that additional periods, or lengths, of the fastener strip 22 may be used.

The upper surface 24 may have two coplanar apex portions 28 separated by a trough portion 30. The lower surface 26 may have two coplanar apex portions 28 separated by a trough portion 34. The two trough portions 30, 34 may be vertically aligned with one another and the apex portions 28, 32 may be vertically aligned with one another. The fastener strip 22 may be symmetrical about a vertical axis 36.

As shown in FIG. 1, a first and a second fastener strip 22 may be located in the central portion 20 of the seat back 10. The fastener strips 22 may be vertically aligned with one another, but spaced apart from one another, as depicted in the figure. In this embodiment, the apex portions 28, 32 of both fastener strips 22 are vertically aligned with one another and the trough portions 30, 34 of both fastener strips 22 are aligned with one another. The second fastener strip 22 may be approximately centered in the seat back 10, generally equidistant from the side portions 16, 18 and the upper and lower portions 12, 14, while the first fastener strip 22 may be located near an upper portion of the central portion 12. The following only references a single fastener strip 22 but it can be understood the discussion applies equally to the second fastener strip 22.

The fastener strip 22 may have a seat cushion side 38 and an opposite cover side 40. The seat cushion side 38 may be connected to the seat back 10, such as directly connected to the seat back 10 without any intervening layers, materials or devices. The seat cushion side 38 may be substantially planar.

The cover side 40 of the fastener strip 22 may be comprised of one part of a hook and loop fastener system. While the hooks or loops may be located on the fastener strip 22, the following will discuss the loops 42 located on the fastener strip 22. The loops 42 may extend substantially across the cover side 40 of the fastener strip 22, or just a portion thereof.

The fastener strip 22 may be connected to the seat back 10 so that the fastener strip 22 is immobile relative thereto. In one embodiment, the cushion side 40 of the fastener strip 22 is bonded to the seat back 10, such as by gluing. It is also permissible for the cushion side 40 of the fastener strip 22 to be molded directly into the seat back 10.

Regardless of the attachment method, the cover side 40 of the fastener strip 22 may be located below the plane formed by the upper edges of the seat portion 16, 18. Further, the cover side 40 of the fastener strip 22 may be substantially co-planar with a surface 44 of the central portion 20 or it may be slightly elevated with respect thereto.

The seat back 10 may be comprised of one or more foam parts, which includes the central portion 20 as well as the upper and lower portions 12, 14 and the side portions 16, 18. As such, the fastener strip 22 can be foam molded directly into the seat back 10 when the seat back 10 is formed.

In one embodiment of a foaming step, the fastener strip 22 can be located in a foaming tool (not shown). The fastener strip 22 can be positioned within the tool with pins, fasteners, temporary adhesive and/or magnetic force. More particularly, the fastener strip 22 can be positioned within the foaming tool and held in place in a location where it is to be located on the subsequently formed seat back 10.

Foam is introduced into the tool and the foam expands to fill the tool interior space. The foam surrounds the fastener strip 22 on its cushion side 38, as well as its upper and lower surfaces 24, 26 to secure it in place.

Figure 2:
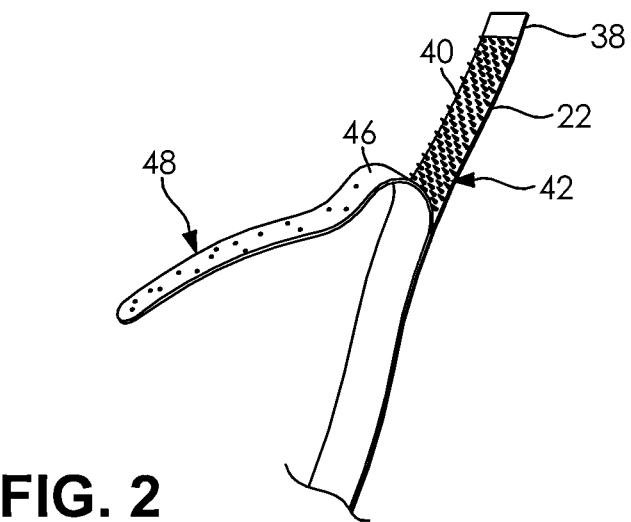
FIG. 2 is a schematic, perspective view of one embodiment of a fastener strip.

In one embodiment, which is schematically depicted in FIG. 2, the fastener strip 22 may be provided with a cover, or gasket 46. The gasket 46 may extend across at least a portion of the cover side 40 of the fastener strip 22, including the embodiment where it extends entirely across the cover side 40. The gasket 46 may also form a seal about the cover side 40 so as to selectively prevent, or reduce, material, such as foam, from contacting, or appreciably contacting, the one of the hook or loop connectors on the cover side 40.

The gasket 46 may be installed on the fastener strip 22 at least during the process where the seat back 10 is formed in the foaming tool. So located, the gasket 46 prevents foam from blocking or clogging the hook or loop connectors on the cover side 40 of the fastener strip 22. When the seat back 10 is removed from the foaming tool, the gasket 46 can be removed, such as pulled away from the fastener strip 22, to reveal and expose the hook or loop connectors.

The gasket 46 may be provided with materials or connectors to permit the attached fastener strip to be properly located within the foaming tool. In one embodiment, the gasket 46 may be embedded, or otherwise connected with, magnetic materials 48. The magnet materials 48 may be such as magnetic powder, magnetic particles, and/or magnetic pieces. The magnetic materials 48 may be located throughout the gasket 46 or in just selected portions. The magnetic materials 48 are attracted to the metal in the foaming tool with a force sufficient to hold the fastener strip 22 in place on the tool. The magnetic materials 48 permit for the selective attachment and positioning (including re-positioning) of the fastener strip 22 within the foaming tool so that it can be located in the correct position.

Figure 3:
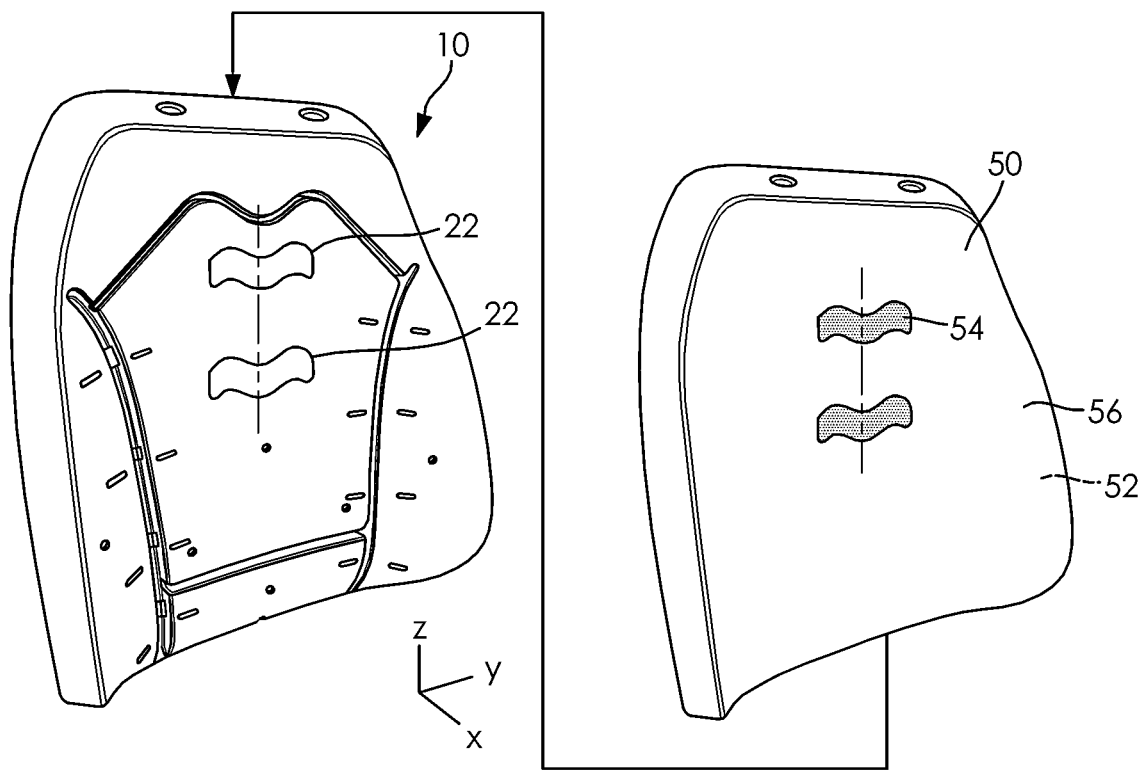
FIG. 3 is a schematic, perspective view of one embodiment of the seat back, fastener strip, and a cover.

A cover 50, one embodiment of which is shown in FIG. 3, may be connected to the seat back 10 after the seat cushion 10 is foamed with the fastener strip 22. The cover 50 can be formed in whole or in part from a textile, a leather or some other natural material or natural woven fabric.

In one embodiment, the seat cover 50 is seamless. By seamless it is meant that there are no seams joining one or more parts of the seat cover 50 together. Seams may be created by welding, adhesives, stitching or other structures. In a further embodiment, at least the portion of the seat cover 50 located at least partially over the side portions 16, 18 and the central portion 20 of the seat cover 50 is seamless. In yet a further embodiment, a portion of the seat cover 50 directly adjacent the fastener strip 22 is seamless, and it may also be continuous and aperture free. The embodiment of the cover 50 in FIG. 3 is shown with edge/corner portions, but it is nevertheless, seamless.

The cover 50 may be wrapped about the seat back 10 or pulled over it to locate it in place. Preferably, the cover 50 is located about the seat back 10 after the gasket 46 has been removed, thus exposing the loop fasteners 42 on cover side 40 of the fastener strip 22. In one embodiment, the loop fasteners 42 are directly connected to an interior side 52 of the cover 50 with no intervening structure or layers. The opposite of the fastener type on the fastener strip 22 may be located on the interior side 52 of the cover 50. For example, if loop fasteners 42 are located on the fastener strip 22, hook portions 54 may be located on the interior side 52 of the cover 50. Continuing with this example understanding the opposite is permissible, the hook portions 54, or the structure that carried them, may be laminated to the interior side 52 of the seat cover 50.

It can be appreciated from the foregoing that the fastener strip 22 is connected to the cover 50 but no part of the fastener strip 22, or other structure, extends through the seat cover 50 from the interior side 52 of the cover 50 to an exterior side 56 of the cover 50, such as would be required with a seam. Thus, the seat cover 50, at least directly adjacent the fastener strip 22, is unitary, one-piece and integrally formed.

The fastener strip 22 secures the cover 50 to the seat back 10 to conform the cover 50 the seat back 10. The cover 50 conforms to the seat back 10, even with the concave nature of the seat back 10, because the fastener strip 22 secures the cover 50 to the seat back 10 and prevents the cover 50 from "tenting" above the seat back 10. It is helpful to note that this confirmation is done without the need for seams or other structures that interrupt the cover 50, particularly at the location of the fastener strip 22.

It is also helpful to note that the seat cover 50, particularly in the area of the fastener strip 22, does not transfer the shape of the fastener strip 22 through the cover 50. It is believe the sinusoidal shape of the fastener strip 22 helps to camouflage the shape of the strip 22 behind the cover 50. Indeed, it has been found that a portion of the exterior side 56 of the seat cover 50 covering the fastener strip 22 is planar and the sinusoidal shape of the fastener strip 22 is not visible on the exterior side 56 of the seat cover 50 when the seat cover 50 is installed on the seat back 10.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A system for connecting a seat cover and a seat back, comprising:
    a seat back comprising an upper portion and an opposite lower portion;
    a seat cover adapted to extend at least partially over the seat back;
    a fastener strip defining a laterally extending sinusoidal shape with an apex portion extending toward the upper portion, and a trough portion extending toward the lower portion, said fastener strip having a planar seat cushion side and an opposite cover side, wherein said seat cushion side is connected to said seat back, wherein said cover side is one part of a hook and loop fastener system; and
    wherein a second part of said hook and loop fastener system on said cover side is connected to an interior side of said seat cover.

2. The system of claim 1, wherein said seat back has a concave shape formed by seat bolsters at least partially bounding side portions of a center section of the seat back wherein the center section is in a lower plane compared with a plane formed by upper edges of the seat bolsters.

3. The system of claim 2, wherein said fastener strip is located within said center section of said seat back to conform said interior side of said seat cover to said seat back.

4. The system of claim 1, wherein a portion of an exterior side of said seat cover is planar and the sinusoidal shape of said fastener strip is not visible on the exterior side of said seat cover when said seat cover is installed on said seat back.

5. The system of claim 1, wherein said seat cover is seamless.

6. The system of claim 5, wherein a portion of said seat cover located at least partially over said side bolsters and entirely over said seat center section is seamless.

7. The system of claim 1, wherein said seat cover directly adjacent said fastener system is continuous, seam free and aperture free.

8. The system of claim 1, wherein said fastener strip is immovably connected to said seat back.

9. The system of claim 1, wherein said sinusoidal shape of said fastener strip comprises an upper surface of said fastener strip with an oscillation of at least one period and a lower surface of said fastener strip with an oscillation of a complementary period to said upper surface.

10. The system of claim 1, wherein said sinusoidal shape of said fastener strip comprises an upper surface with two coplanar apex portions separated by a trough portion and a lower surface with two coplanar apex portions separated by a trough portion, wherein said trough portions are vertically aligned with one another and said two pairs of coplanar apex portions are vertically aligned with one another.

11. The system of claim 10, wherein a plane in which said cover side of said fastener strip is located is below said plane formed by upper edges of the seat bolsters.

12. The system of claim 10, wherein the apex portions and the trough portion extend up and down, respectively, along a seat back height direction.

13. The system of claim 1, wherein no part of said fastener system extends through said seat cover from said interior side to an exterior side of said cover.

14. The system of claim 1, wherein said seat cover directly adjacent said fastener system is unitary, one-piece and integrally formed.

15. The system of claim 1, wherein the second part of said hook and loop fastener system on said cover side is laminated to the interior side of said seat cover.

16. The system of claim 1, wherein said fastener strip is directly connected to said interior side of said seat cover with no intervening structures or layers.

* * * * *